(12) United States Patent
Small et al.

(10) Patent No.: US 12,179,236 B2
(45) Date of Patent: Dec. 31, 2024

(54) SYSTEMS AND METHODS FOR AUTOMATED PRESCRIPTION PREPARATION

(71) Applicant: McKesson Corporation, Irving, TX (US)

(72) Inventors: Cody Small, Loveland, CO (US); Timothy Chambers, Longmont, CO (US)

(73) Assignee: McKesson Corporation, Irving, TX (US)

(*) Notice: Subject to any disclaimer, the term of this patent is extended or adjusted under 35 U.S.C. 154(b) by 240 days.

(21) Appl. No.: 17/855,170

(22) Filed: Jun. 30, 2022

(65) Prior Publication Data

US 2024/0001406 A1 Jan. 4, 2024

(51) Int. Cl.
| | | |
|---|---|---|
| *B65B 5/08* | (2006.01) | |
| *B07C 5/34* | (2006.01) | |
| *B07C 5/36* | (2006.01) | |
| *B65G 1/137* | (2006.01) | |
| *B65G 43/08* | (2006.01) | |

(Continued)

(52) U.S. Cl.
CPC ............ *B07C 5/3412* (2013.01); *B07C 5/362* (2013.01); *B65B 5/08* (2013.01); *B65G 1/1373* (2013.01); *B65G 1/1376* (2013.01); *B65G 1/1378* (2013.01); *B65G 43/08* (2013.01); *B65G 47/905* (2013.01); *B65G 2203/0216* (2013.01); *B65G 2203/041* (2013.01); *B65G 2209/00* (2013.01); *B65G 2811/0678* (2013.01); *B65G 2814/0302* (2013.01)

(58) Field of Classification Search
CPC ...... B07C 5/3412; B07C 5/362; G16H 20/13; B65B 5/08; B65G 1/1373; B65G 1/1376; B65G 1/1378; B65G 43/08; B65G 47/905; B65G 2203/0216; B65G 2203/041; B65G 2209/00; B65G 2811/0678; B65G 2814/0302
See application file for complete search history.

(56) References Cited

U.S. PATENT DOCUMENTS

| | | | |
|---|---|---|---|
| 6,681,149 B2 * | 1/2004 | William ................. | G16H 20/13 700/235 |
| 6,892,512 B2 * | 5/2005 | Rice ...................... | G16H 70/40 53/445 |

(Continued)

*Primary Examiner* — Douglas A Hess
(74) *Attorney, Agent, or Firm* — Ballard Spahr LLP

(57) ABSTRACT

A system includes a conveyor and a computing device in communication with the conveyor. The conveyor has a plurality of carriers that are moved about and between at least one automated prescription picking system and at least one automated prescription packing system. Each carrier of the plurality of carriers is configured to receive at least one prescription from the at least one automated prescription picking system and deliver the at least one prescription to the at least one automated prescription packing system. The computing device includes at least one processor and a memory in communication with the at least one processor. The memory includes instructions that, when executed by the at least one processor, cause the at least one processor to: associate an identifier with each prescription of the at least one prescription; and track contents of each carrier of the plurality of carriers.

18 Claims, 3 Drawing Sheets

(51) Int. Cl.
*B65G 47/90* (2006.01)
*G16H 20/13* (2018.01)

(56) References Cited

U.S. PATENT DOCUMENTS

| | | | | |
|---|---|---|---|---|
| 7,912,582 | B1 * | 3/2011 | Holtje | G07F 11/165 |
| | | | | 700/242 |
| 8,215,543 | B2 * | 7/2012 | Carson | G07F 11/1657 |
| | | | | 235/375 |
| 9,665,688 | B2 * | 5/2017 | Terzini | G16H 20/13 |
| 10,053,248 | B2 * | 8/2018 | Joplin | B65B 35/56 |
| 10,430,554 | B2 * | 10/2019 | Jaskela | G16H 20/13 |
| 10,695,902 | B2 * | 6/2020 | Hoffman | G05B 15/02 |
| 11,299,346 | B1 * | 4/2022 | Hoffman | B65B 61/20 |
| 11,424,016 | B1 * | 8/2022 | Hoffman | G16H 40/67 |
| 11,548,037 | B1 * | 1/2023 | Hoffman | B65G 47/261 |
| 11,735,304 | B2 * | 8/2023 | Chambers | G07F 9/006 |
| | | | | 53/473 |
| 11,820,543 | B1 * | 11/2023 | Hoffman | B65G 1/1378 |

* cited by examiner

SYSTEMS AND METHODS FOR AUTOMATED PRESCRIPTION PREPARATION

FIELD

This application relates to systems and methods for preparing prescriptions and, in exemplary aspects, to systems and methods that include automated delivery of prescriptions from an automated prescription picking system to an automated prescription packing system.

BACKGROUND

Automated prescription picking systems are designed to dispense and label products, such as high running single-item unit of use products within the mail order and central fill pharmacy environments. Prescription packing systems are used to provide packaging for tote and bottle/vial prescription products throughout the mail order and central fill pharmacy industry. Conventionally, operators are required to manually handle labeled products and then deliver labeled products from the prescription picking system to the prescription packing system.

Accordingly, a way of minimizing or eliminating operator intervention is desirable.

SUMMARY

Disclosed herein, in various aspects, is a system including a conveyor and a computing device in communication with the conveyor. The conveyor can have a plurality of carriers. The conveyor can be configured to move the plurality of carriers about and between at least one automated prescription picking system and at least one automated prescription packing system. Each carrier of the plurality of carriers can be configured to receive at least one prescription from the at least one automated prescription picking system and deliver the at least one prescription to the at least one automated prescription packing system. The computing device can include at least one processor and a memory in communication with the at least one processor. The memory can include instructions that, when executed by the at least one processor, cause the at least one processor to: associate an identifier with each prescription of the at least one prescription; and track contents of each carrier of the plurality of carriers, wherein the contents of each carrier of the plurality of carriers are one of: empty; or one or more prescriptions, each prescription of the one or more prescriptions having an identifier associated therewith.

In further aspects, disclosed herein is a method that includes moving, by a plurality of carriers of a conveyor, a plurality of prescriptions from at least one automated prescription picking system to at least one automated prescription packing system. Optionally, the method can also include associating an identifier with each prescription of the plurality of prescriptions; and tracking contents of each carrier of the plurality of carriers, wherein the contents of each carrier of the plurality of carriers are one of: empty; or one or more prescriptions, each prescription of the one or more prescriptions having an identifier associated therewith.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
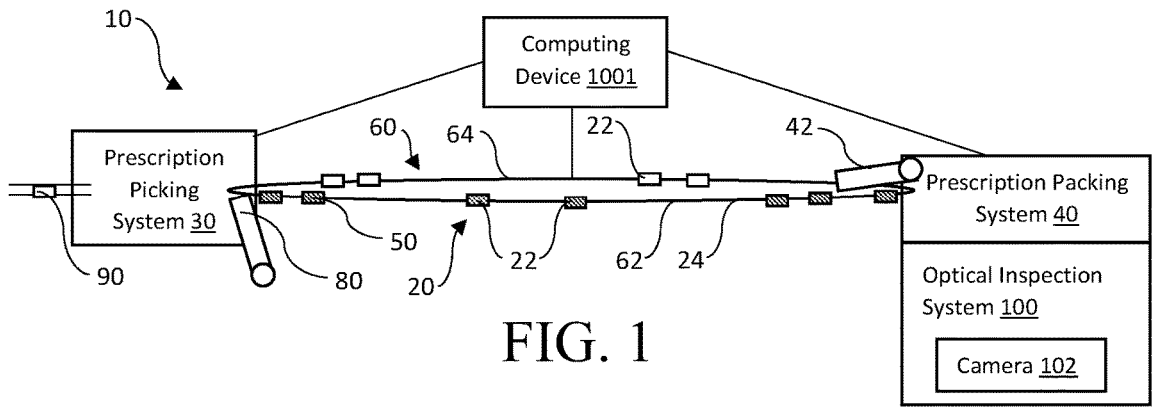
FIG. 1 is a block diagram of a system as disclosed herein.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a carrier" includes one or more of such carriers, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Figure 2:
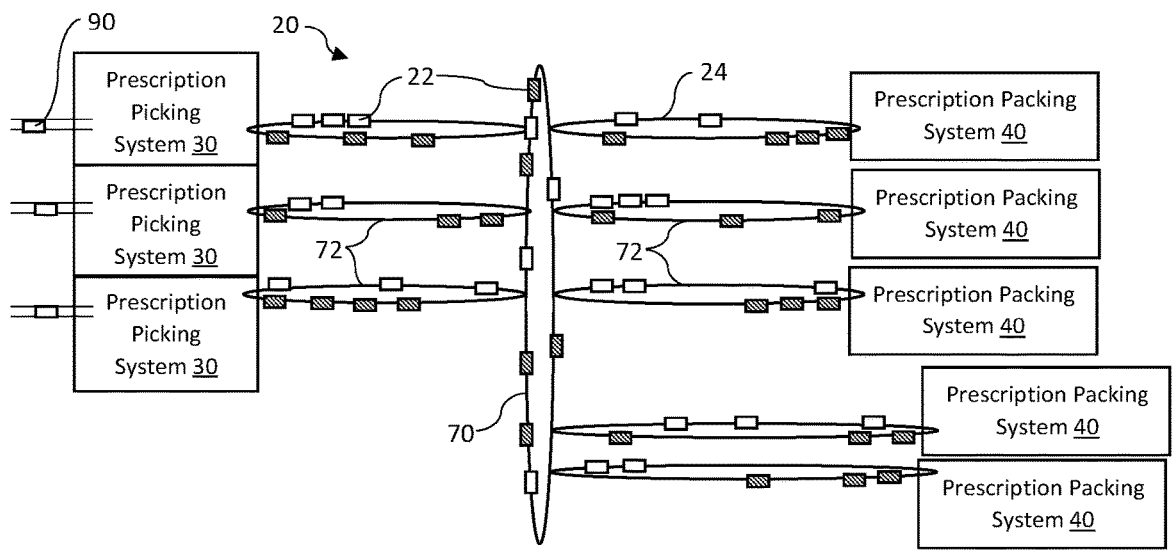
FIG. 2 is a block diagram of a conveyor system with a plurality of automated prescription picking systems and a plurality of automated prescription packing systems.
Figure 3:
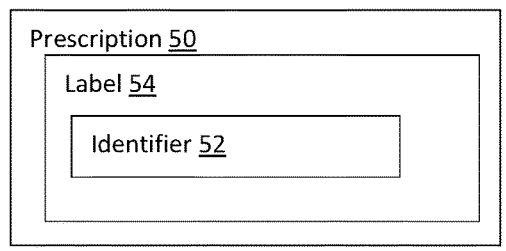
FIG. 3 is a block diagram of an exemplary prescription as disclosed herein.

Disclosed herein and with reference to FIGS. 1-2, is a system 10 for automated prescription preparation and processing. The system 10 can comprise a conveyor 20 having at least one carrier 22 (optionally, a plurality of carriers). The conveyor 20 can be configured to move the carriers 22 about and between at least one automated prescription picking system 30 and at least one automated prescription packing system 40. Each carrier 22 of the at least one carrier (optionally, plurality of carriers) can be configured to receive one or more prescriptions 50 from the at least one automated prescription picking system 30 and deliver the one or more prescriptions to the at least one automated prescription packing system 40.

Optionally, the automated prescription picking system(s) 30 can comprise portions of a conventional automated prescription picking system. For example, the automated prescription picking system can be configured to track, move, and arrange unit-of-use prescriptions for shipment. The automated prescription picking system can comprise receptacles that store pluralities of various prescriptions. The automated prescription picking system can receive an order for one or more prescriptions, and move the one or more prescriptions to a staging area. Aspects of a conventional automated prescription picking system are disclosed in U.S. patent application Ser. No. 15/716,377, filed Sep. 26, 2017, which is incorporated by reference herein.

Similarly, in some optional aspects, the automated prescription packing system(s) 40 can comprise elements of a conventional automated prescription packing system that is configured to receive and prepare prescriptions for shipment.

As used herein, prescriptions 50 can be unit of use prescriptions. For example, the unit of use prescriptions can include blister packs, tubes, or other unit of use containers. In further aspects, the prescriptions 50 can comprise bottles or vials with pills (e.g., tablets and capsules) therein.

Figure 5:
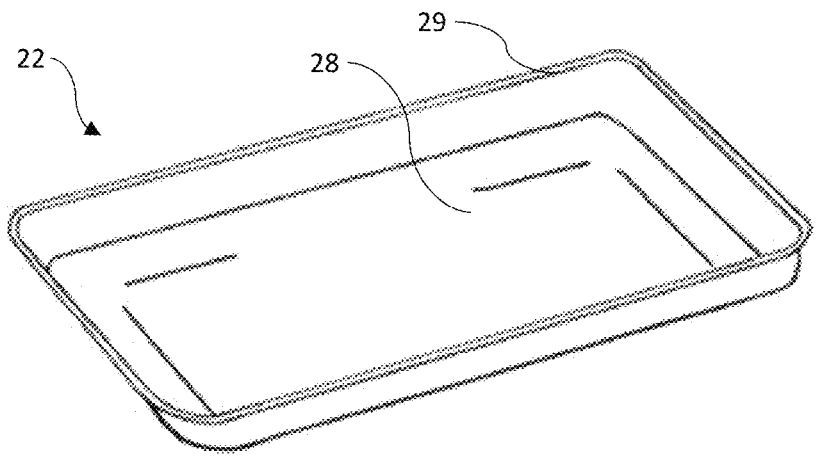
FIG. 5 is a perspective view of an exemplary carrier of a conveyor a disclosed herein.

Referring also to FIG. 5, in some aspects, each of the carriers 22 can comprise, for example, a platform 28 upon which one or more prescriptions can be placed. For example, the carriers can have a tray shape, with a flat platform peripherally surrounded by a lip 29. The lip 29 can extend upwardly by, for example, 1-2 inches. The platform can optionally have a texture (e.g., rubber or other polymer) to provide frictional contact with the prescriptions to inhibit movement of the prescriptions within the carrier. The carriers can be polygonal (e.g., square or rectangular), circular, or any suitable shape. In exemplary aspects, the carriers can be configured to receive a plurality of prescriptions 50 spaced laterally (horizontally) from each other. The platform 28 of the carrier 22 can optionally have a surface area from about 10 square inches to about 150 square inches. In exemplary aspects, the carriers 22 can be configured to hold, for example, 4 different prescriptions. The carriers can optionally simultaneously carry multiple prescriptions prepared for different orders, as further described herein. In alternative aspects, each carrier 22 can receive, at any one time, prescriptions for only one single order.

A computing device 1001 can be in communication with the conveyor. The computing device 1001 can be configured as described further herein. The computing device 1001 can comprise at least one processor (e.g., processor 1003) and a memory (e.g., mass storage device 1004) in communication with the at least one processor. The memory can comprise instructions that, when executed by the at least one processor, cause the at least one processor to: a) associate an identifier 52 with each respective prescription; and b) track contents of each carrier of the plurality of carriers. For example, each carrier can have a respective identifier, and the computing device 1001 can associate (e.g., link in memory) the identifier 52 of the prescription with the identifier of the carrier receiving the prescription. The contents of each carrier 22 of the plurality of carriers can be one of: empty (shown as un-filled boxes in FIGS. 1-2); or one or more prescriptions, each prescription having an identifier associated therewith (shown as a shaded box in FIGS. 1-2).

Figure 6:
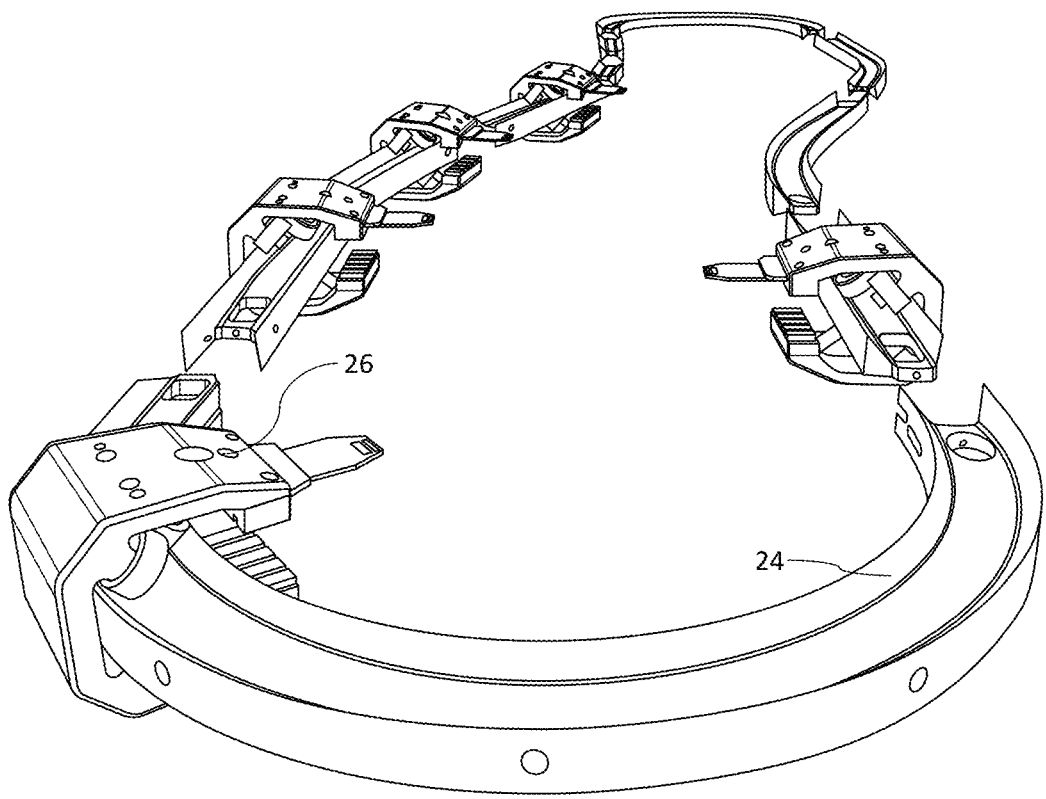
FIG. 6 is a perspective view of portions of an exemplary conveyor as disclosed herein.

Referring to FIG. 6, in some optional aspects, the conveyor 20 can comprise a monorail 24 along which the carriers 22 move. In exemplary aspects, the conveyor 20 can further comprise a plurality of trolleys 26 that move the couple to the carriers 22 and move the carriers along the monorail 24. Optionally, the trolleys 26 can each be secured or otherwise coupled to a chain that moves along a length of the monorail. The trolleys can be spaced along the length of the chain. Optionally, the chain can be enclosed within the monorail structure. Alternatively, it is contemplated that the monorail can comprise an I-beam structure, and the chain can be positioned below the I-beam structure. The conveyor 20 can further comprise a motor that drives movements of the chain. In exemplary aspects, the motor can be communicatively coupled to the computing device 1001, and the processor 1003 of the computing device 1001 can control operation of the motor. It is contemplated that each of the carriers 22 can be coupled to (e.g., suspended from) one or more trolleys, which can extend downwardly from the chain. In various other aspects, the conveyor 20 can comprise carriers 22 that move independently therealong. For example, the conveyor can comprise, a MAGNEMOTION (e.g., MAGNEMOVER LITE) conveyor, or a XTS BECKHOFF linear products transport, or components thereof. Accordingly, as should be understood, the interface between the carriers 20 and track (e.g., the monorail 24) can utilize known conveyor technology.

In some optional aspects, the conveyor 20 can comprise a single loop 60, as illustrated in FIG. 1. For example, the conveyor 20 can comprise an outgoing path portion 62 that delivers carriers with prescriptions therein from the at least one automated prescription picking system 30 to the at least one automated prescription packing system 40. In exemplary aspects, the at least one automated prescription picking system can consist of a single automated prescription picking system 30. In further exemplary aspects, the at least one automated prescription packing system can consist of a single automated prescription packing system 40.

In alternative aspects, the conveyor 20 can comprise a central manifold loop 70 and a plurality of branch loops 72 that extend between the central manifold loop and one of an automated prescription picking system or an automated prescription packing system. For example, a respective branch loop 72 can extend between the central manifold loop 70 and each automated prescription picking system 30, and a respective branch loop 72 can extend between the central manifold loop 70 and each automated prescription packing system 40. In further aspects, a single branch loop can service two or more automated prescription picking systems 30 or automated prescription packing systems 40. The plurality of carriers 22 of the conveyor 20 can be configured to move across (e.g., transition between) the central manifold loop 70 and the plurality of branch loops 72.

A robotic end effector 80 can be configured to move the prescriptions 50 from the at least one automated prescription picking system 30 to a carrier 22 of the plurality of carriers of the conveyor 20. In exemplary aspects, the robotic end effector 80 can be configured to place the prescription 90 in a particular orientation in the carrier 22. For example, the robotic end effector 80 can be configured to place the prescription 90 with the identifier facing upwardly (or in another particular orientation) for capture (e.g., optical scanning) while in the carrier 22. The end effector 80 can include, for example, two or more grippers that move toward or away from each other, one or more vacuum grippers, a scoop, or any suitable gripping elements. The robotic end effector 80 can be moved by a multi-axis (e.g., 5-axis or 6-axis) robotic arm or a gantry.

The system 10 can further comprise at least one tote 90 that is positioned at the at least one automated prescription picking system 30. As should be understood, totes are known and used in the art for use with automated prescription picking systems. In some aspects, the memory of the computing device 1001 can comprise instructions that, when executed by the at least one processor, cause the at least one processor to: move, by the robotic end effector and based on the identifier associated with a respective prescription, the respective prescription from the at least one automated prescription picking system to either a tote of the at least one tote or the conveyor. Thus, for certain prescriptions that are not compatible with the conveyor 20 or otherwise are special case items, a tote 90 can be used instead of the conveyor 20 to transport the prescriptions. Still further, in situations in which the conveyor 20 is out of service (e.g., for maintenance or other reasons), the conveyor can be circumvented by use of the totes 90. That is, in some optional aspects, the memory of the computing device 1001 can comprise instructions that, when executed by the at least one processor, cause the at least one processor to: move, by the robotic end effector 80, all of the prescriptions 50 from the at least one automated prescription picking system to the at least one tote 90.

In various optional aspects, the identifier 52 can be a barcode. In further aspects, the identifier 52 can be any other optical code, such as, for example, a QR code. In yet other aspects, the identifier 52 can be an alphanumeric code or a radio frequency identification (RFID) code.

The system 10 can further comprise an optical inspection system 100 comprising a camera 102. The optical inspection system 100 can be configured to capture the identifier associated with the respective prescription. For example, the camera 102 can be configured to capture the identifier. In further aspects, a laser scanner, RFID scanner, or other optical scanner can be configured to capture the identifier. In some aspects, the optical inspection system 100, either via an on-board processing unit and memory or through communication with the computing device, can be configured to confirm accuracy of an order based on the captured identifier. In various aspects, the optical inspection system 100 can comprise optical character recognition software to detect text of the identifier. In other aspects, the optical detection system can detect color size, or a quantity of prescriptions to determine accuracy of the order. In still further aspects, the system 10 can comprise a weight station that measures mass to determine accuracy of a prescription or order comprising a plurality of prescriptions.

In addition or alternatively to confirming accuracy, the optical inspection system 100 can be configured to capture and store an image of the prescription(s). For example, an order can comprise a single prescription or a plurality of prescriptions. In some aspects, the image can be of some or all of the prescriptions of a single order. In this way, the system 10 can maintain a record of orders prepared.

In some aspects, the optical inspection system 100 can include a camera and/or another optical sensor (e.g., a laser scanner), and the camera and/or other optical scanner can be in communication with the computing device 1001. In further aspects, the optical inspection system can comprise a separate computing device that is in communication with the camera and/or other optical scanner. Said separate computing device can be configured to process data associated with optical data captured by the camera and/or other optical scanner. Said separate computing device can further be in communication with the computing device 1001.

In some aspects, optical inspection system 100 (via the computing device 1001 or a separate computing device) can determine that an order is incorrect. For example, the captured identifier(s) can be compared to correct identifier(s) for an order, and inconsistency between the captured identifier(s) and the correct identifier(s) can indicate an incorrect order. In further aspects, a missing prescription or an extra prescription can correspond to an incorrect order. In response to detecting an incorrect order, an alarm can be triggered. For example, a notification can be sent to an operator via an operator interface. In further aspects, the order can be re-initiated, and the system 10 can attempt to process the order again.

In some aspects, the system 10 can comprise a first optical inspection system associated with the automated prescription picking system 30, and a second optical inspection system can inspect prescriptions received at the automated prescription packing system 40. In this way, the prescriptions pulled from the automated prescription picking system 30 can be confirmed, and the prescriptions received at automated prescription packing system 40 can once again be confirmed.

As stated, in some aspects, an order can comprise a plurality of prescriptions. In these aspects, the memory of the computing device 1001 can comprise instructions that, when executed by the at least one processor, cause the at least one processor to: arrange a plurality of prescriptions into a batch shipment. For example, the batch shipment can comprise a plurality of prescriptions that are associated with a single patient. The batch shipment can thus be prepared for shipping in a single shipping container. Accordingly, the plurality of prescriptions can be provided together to an automated prescription packing system 40. The computing device 1001 can coordinate delivery of the plurality of prescriptions to the prescription packing system 40 via the prescription picking system(s) 30 and the conveyor 20. In further aspects, batches can be broken into two or more shipping containers based on shipping limits such as volumes.

In some optional aspects, the system 10 can comprise the at least one automated prescription picking system 30 and the at least one automated prescription packing system 40.

Method of Use

A method can comprise moving, by a plurality of carriers 22 of the conveyor 20, prescriptions 50 from at least one automated prescription picking system 30 to at least one automated prescription packing system 40.

An identifier 52 can be associated with each respective prescription 50. Contents of each carrier 22 of the plurality of carriers can be tracked. For example, the system 10 can continually update a database of a position of each prescription from the automated prescription picking system 30, to the particular carrier 22 (or tote 90) in which the prescription is located, to the automated prescription packing system 40, and, optionally, after the prescription 50 has been packed and shipped (e.g., by tracking a shipping label during delivery).

In some aspects, the method can further comprise receiving a container comprising a prescription by the automated picking system 30. In optional aspects, the container can comprise, for example, a unit-of-use prescription (e.g., a blister pack). The method can comprise applying a label 54 to the container, wherein the label comprises the identifier 52.

The prescriptions(s) 50 can be prepared for shipping at the at least one automated prescription packing system 40. For example, the prescriptions can be placed in a shipping container (e.g., a bag or box) and labeled. Optionally, a single order can comprise a plurality of prescriptions in a single shipping container. In further aspects, the prescriptions can be provided in respective shipping containers.

The identifier 52 associated with the respective prescription 50 can be captured by the optical inspection system 100. Accuracy of the order can be confirmed based on the captured identifier 52. For example, for a given order comprising one or a plurality of prescriptions, the captured identifier can be compared to an expected identifier of a correct order. Additionally or alternatively, an image of the respective prescription can be captured and stored.

In various aspects, the method does not comprise hands-on contact of an operator during movement of the prescriptions 50 from the at least one automated prescription picking system 30 to the at least one automated prescription packing system 40. In still further aspects, the method does not comprise hands-on contact from receipt of the prescription at the automated prescription picking system 30 through packing of the prescription at the automated prescription packing system 40.

Exemplary Sequence

In an exemplary sequence, empty totes 90 and carriers 22 can be staged at the in-feeds for each automated prescription picking system 30 for order induction and/or placement.

An order (including single or multiple prescriptions) can enter the automated prescription picking system 30.

The computing device can comprise instructions that, when executed by the at least one processor, flag the order to be provided to a tote 90 or to the conveyor 20. That is, the computing device 1001 can determine whether the system 10 provides the prescription(s) to the tote 90 or the conveyor 20.

The automated prescription picking system 30 can pick and label the prescriptions 50 of the order.

If not eligible for use with the conveyor 20, the automated prescription picking system 30 can place, via the robotic end effector 80, the order within a tote 90. If eligible for use with the conveyor 20, the automated prescription picking system 30 can place, via the robotic end effector 80, the order within one or more carriers. For example, the automated prescription picking system 30 can place the entire order in a single carrier. Alternatively, the order can be divided among multiple carriers. The totes 90 can serve as a back up to the conveyor 20 if needed.

The carrier 22 can move to an automated prescription packing system 40 system for packaging. The carrier 22 can enter an assigned automated prescription packing system 40 system queue.

The automated prescription packing system 40 can process all paperwork (e.g., print shipping labels and any documentation, such as, for example, prescription instructions for the patient or other informational paperwork (such as, for example, coupons, newsletters, marketing materials, and the like). Optionally, paperwork can be processed prior to receiving the carrier 22 with the prescription therein.

Once the carrier 22 enters a product picking location of the automated prescription packing system 40, the imaging system 100 can verify all products to be packaged via the identifier(s) 52 (e.g., patient specific 2D barcode) as well as by capturing a final as-dispensed image of all products prior to picking/packing.

Once the as-dispensed image is complete and the identifier(s) 52 is verified, a robot 42 (e.g., a six-axis robot) can pick and place each prescription into a correct shipping container (e.g., a bag or a box).

The carrier 22 can be disassociated from all previous order data and can then be ready for recirculation back to an automated prescription picking system 30. For example, the identifier of the carrier can be disassociated with the identifier 52 of the prescription 50 previously carried therein.

Advantages of the Disclosed System

The system can adaptably use both totes 90 and the conveyor 20. The totes 90 can serve as the back-up for processing anomalies and exceptions.

The new monorail process can provide a 100% automated dispense-to-ship (DTS) for unit of use article (UUA) fulfilment that does not require hands-on contact with the prescriptions by an operator.

Costs for fulfilment can be reduced per script. The pharmacy can have a smaller footprint than conventional pharmacies, reducing building special needs.

The automated prescription packing system 40 can comprise a six-axis robot for dual purpose compatibility with Tablet Capsule Automation (TCA) DTS and the new UUA DTS processing.

The system 10 can be adaptable for a single system configuration (FIG. 1) or a distributed layout (FIG. 2) for equipment redundancy and package size.

Computing Device

Figure 4:
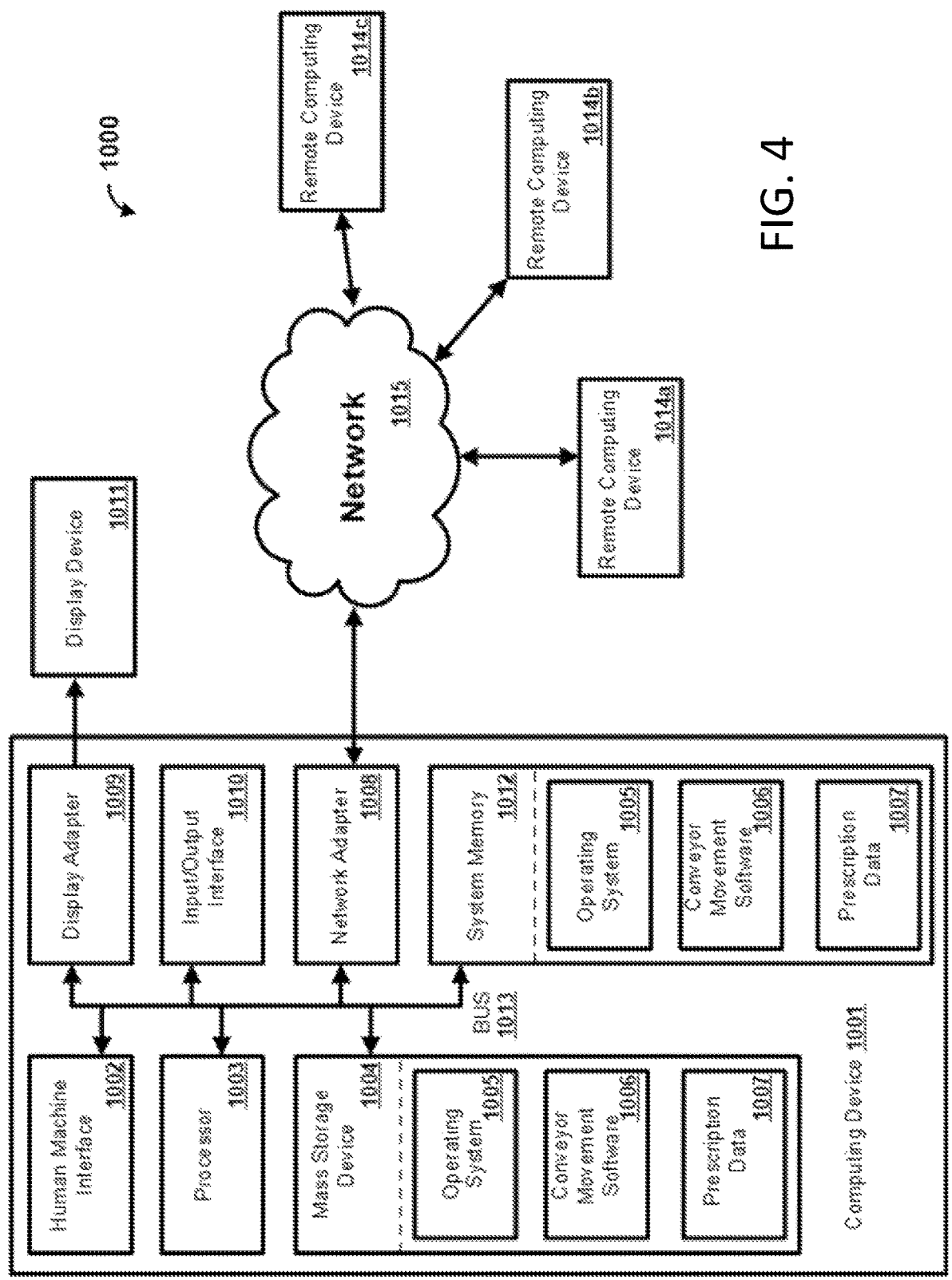
FIG. 4 is a computing environment comprising a computing device as disclosed herein.

FIG. 4 shows an operating environment 1000 including an exemplary configuration of a computing device 1001 for use with the system 10 (FIG. 1).

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as prescription data 1007 and/or program modules such as operating system 1005 and conveyor movement software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and conveyor movement software 1006 may be stored on the mass storage device 1004. One or more of the operating system 1005 and conveyor movement software 1006 (or some combination thereof) may comprise program modules and the conveyor movement software 1006. The prescription data 1007 may also be stored on the mass storage device 1004. The prescription data 1007 may be stored in any of one or more databases known in the art. The databases may be centralized or distributed across multiple locations within the network 1015.

A user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014*a,b,c* may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a,b,c* can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the system 1000 can be configured with internet connectivity.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A system comprising:
a conveyor comprising a plurality of carriers, wherein the conveyor is configured to move the plurality of carriers about and between at least one automated prescription picking system and at least one automated prescription packing system, wherein each carrier of the plurality of carriers is configured to receive at least one prescription from the at least one automated prescription picking system and deliver the at least one prescription to the at least one automated prescription packing system;
a computing device in communication with the conveyor, wherein the computing device comprises at least one processor and a memory in communication with the at least one processor, wherein the memory comprises instructions that, when executed by the at least one processor, cause the at least one processor to:

associate an identifier with each prescription of the at least one prescription;

track contents of each carrier of the plurality of carriers, wherein the contents of each carrier of the plurality of carriers are one of:
    empty; or
    one or more prescriptions, each prescription of the one or more prescriptions having an identifier associated therewith; and an optical inspection system comprising a camera, wherein the optical inspection system is configured to:
    capture the identifier associated with each prescription of the at least one prescription;
    confirm accuracy of an order based on the captured identifier; and
    store an image of the respective prescription.

2. The system of claim 1, wherein the conveyor comprises a monorail.

3. The system of claim 1, wherein the conveyor comprises a single loop.

4. The system of claim 3, wherein the at least one automated prescription picking system consists of a single automated prescription picking system, and wherein the at least one automated prescription packing system consists of a single automated prescription packing system.

5. The system of claim 1, wherein the conveyor comprises a central manifold loop and a plurality of branch loops that extend between the central manifold loop and one of:
    an automated prescription picking system of the at least one automated prescription picking system; or
    an automated prescription packing system of the at least one automated prescription packing system,
    wherein the plurality of carriers of the conveyor are configured to move across the central manifold loop and the plurality of branch loops.

6. The system of claim 1, further comprising a robotic end effector that is configured to move the at least one prescription from the at least one automated prescription picking system to a carrier of the plurality of carriers of the conveyor.

7. The system of claim 1, further comprising at least one tote that is positioned at the at least one automated prescription picking system,
    wherein the memory comprises instructions that, when executed by the at least one processor, cause the at least one processor to:
    move, by the robotic end effector and based on the identifier associated with a respective prescription, the respective prescription from the at least one automated prescription picking system to either a tote of the at least one tote or the conveyor.

8. The system of claim 1, wherein the identifier is a barcode.

9. The system of claim 1, wherein the memory comprises instructions that, when executed by the at least one processor, cause the at least one processor to: arrange a plurality of prescriptions into a batch shipment.

10. The system of claim 1, further comprising the at least one automated prescription picking system and the at least one automated prescription packing system.

11. A method comprising:
    moving, by a plurality of carriers of a conveyor, a plurality of prescriptions from at least one automated prescription picking system to at least one automated prescription packing system;
    capturing, by an optical inspection system, an identifier associated with the respective prescription;
    confirming accuracy of an order based on the captured identifier; and
    storing an image of the respective prescription.

12. The method of claim 11, further comprising:
    associating an identifier with each prescription of the plurality of prescriptions; and
    tracking contents of each carrier of the plurality of carriers, wherein the contents of each carrier of the plurality of carriers are one of:
        empty; or
        one or more prescriptions, each prescription of the one or more prescriptions having an identifier associated therewith.

13. The method of claim 11, further comprising:
    obtaining a prescription of the plurality of prescriptions; and
    associating a label with the prescription, wherein the label comprises the identifier.

14. The method of claim 13, further comprising: preparing at least one prescription of the plurality of prescriptions for shipping at the at least one automated prescription packing system.

15. The method of claim 11, wherein the method does not comprise hands-on contact of an operator during movement of the plurality of prescriptions from the at least one automated prescription picking system to the at least one automated prescription packing system.

16. The method of claim 11, wherein the conveyor comprises a monorail.

17. The method of claim 11, wherein the conveyor comprises a single loop.

18. The method of claim 11, wherein the conveyor comprises a central manifold loop and a plurality of branch loops that extend between the central manifold loop and one of an automated prescription picking system of the at least one automated prescription picking system or an automated prescription packing system of the at least one automated prescription packing system, wherein the carriers are configured to move across the central manifold loop and the plurality of branch loops.

* * * * *